Patented Nov. 17, 1931

1,831,894

UNITED STATES PATENT OFFICE

EMIL TRUOG, OF MADISON, WISCONSIN

METHOD OF TESTING REACTION OF SUBSTANCES

No Drawing.   Application filed September 24, 1930. Serial No. 484,251.

The invention relates to a method of determining the chemical characteristics of soils, powders, various porous substances, semi-solids and emulsions and mixtures of these materials by means of indicators, such as dyes or other coloring matter, and has for its object to provide a method simpler and more expeditious than those now in use.

Another object of the invention is to provide a method for determining the acidic or alkaline characteristics of substances which will be not only simpler but more accurate than has heretofore been employed. Also, due to the intimate contact which the indicator has with the substance tested, by reason of the present invention, a sensitive method is secured capable of being used to test substances having only a very slight acid or alkaline reaction which the methods heretofore used would not detect.

For better understanding of the underlying principles of the present invention, it may be stated that substances have either an acid reaction or an alkaline reaction and if they exhibit neither of these characteristics they are known as neutral substances. For commercial reasons and also for purposes of laboratory experiments it is necessary to determine accurately whether a substance is acidic or alkaline, or whether it can be considered a neutral substance. Various chemical indicators now in use for determining the reaction of substances are dyes and similar coloring matters having the property of changing their hue upon being treated with an acid and an alkali in succession. Thus, Congo red when treated with an alkaline solution remains red but when treated with an acid substance changes to blue and thus acts in just the opposite way to litmus, another well known indicator.

In general there are in use at the present three principal and conventional methods of determining the reaction of substances by determining their reaction to indicators as described. In one of these methods a water extract of the substance is first made. To this extract is added a suitable indicator which imparts to the extract a shade of color dependent upon the chemical constituents of the substance, that is, whether the same is acidic or alkaline. The efficiency of this method is dependent upon the assumption that the water while in contact with the substance attains the same chemical characteristics of the substance as regards reaction and only if such is the case does the method accurately determine the reaction of the substance.

In one of the other methods a solution of the indicator is allowed to percolate through the porous body to be tested. The shade of color of the liquid which emerges is thus indicative of the reaction of the material in question. In the third method test papers are prepared by impregnating strips of paper with the indicator to be used. The papers are then pressed against the moistened solid being tested, which in time imparts to the indicator on the paper a color characteristic of the reaction of the solid. These methods have been found to be inefficient since by the former method too much time is often required to allow the indicator to percolate through the porous body while in the latter the result is often times inaccurate when testing substances of only a slight acid or alkaline characteristic, since the pressing of the test papers against the solid does not bring the indicator into sufficiently intimate contact.

In the improved method comprising the present invention a method has been secured which is accurate in all instances and which is capable of being used with soils, porous substances and semi-liquids. The method comprises placing a portion of the soil or substance to be tested upon a spot-plate, spoon or any small cup or similar vessel and in adding and thoroughly mixing by means of a stirring rod just enough of a solution of the appropriate indicator to produce a fluid mixture. In this mixture it will be obvious that the color of the indicator is masked and hidden more or less by the color of the substance and in order to remove some of the indicator so that its color can be determined, the present method employs a white, neutral and difficultly soluble powder which is preferably sprinkled from a suitable shaker onto the surface of the fluid mixture. This powder absorbs some of the indicator and thus attains the brilliant color of the same, which color by means of known standards indicates the reaction of the substance in question and thus its chemical characteristics.

It has been found that natural gypsum, barite, fluorspar and quartz when ground to pass a fine mesh sieve produce satisfactory white powders for this purpose. Any white, neutral or nearly neutral substance of difficult solubility in water or indicator solution may, of course, be used as a source of the white powder. It has also been found that indicator dyes like brom cresol green, brom cresol purple, chlor phenol red, phenol red, cresol red and mixtures of one or more of these are satisfactory ones and have been used in the present method with accurate results, although many others of course may be used, as the present invention is not restricted in any manner to any particular indicator. In making the indicator dye solution it is advantageous to use ethyl or methyl alcohol, it having been determined by experiment that two parts of water and one part of alcohol by volume form a satisfactory proportion. The addition of this alcohol facilitates the wetting of the material or substance tested and also of the white powder in addition to adding to the brilliance of the color produced by the dye and the white powder.

The present method of testing the reaction of substances has been found to be more accurate than the methods heretofore used because the indicator is thoroughly intermixed with the substance tested and therefore comes into very intimate contact with the substance, thus allowing equilibrium to be quickly established. Also the present method is considered more efficient than others since the indicator which is withdrawn is made to display its full brilliance through absorption by the white powder. The process is also more rapid because there is no waiting for percolation to take place or slow acting test papers to react.

Although there has been described what is considered the preferred manner of carrying out the invention, it is to be understood that the same is merely illustrative and modifications may be made without departing from the scope of the invention.

I claim:

1. The method of determining the acidity or alkalinity of substances which consists in adding to said substances an indicator to form a fluid mixture, and adding to said fluid mixture a substantially white substance to absorb and display the color attained by the indicator.

2. The method of determining the acidity or alkalinity of substances which consists in forming with said substances a fluid mixture by adding thereto an appropriate dye solution, and adding to said mixture a substantially white powder, whereby said powder absorbs the dye solution and displays the color attained thereby.

3. The method of determining the acidity or alkalinity of substances which consists in forming with said substances a fluid mixture by adding thereto an indicator solution capable of exhibiting a color to indicate the acidity or alkalinity of the mixture, and adding to said mixture a substantially white powder to absorb and display the color attained by the solution.

4. The method of determining the acidity or alkalinity of substances which consists in forming with said substances a fluid mixture by adding an alcohol to said substance, adding an indicator to said mixture capable of exhibiting a color to indicate the acidity or alkalinity of the mixture, and adding to said mixture a substantially white powder to absorb and display the color attained by the solution.

Signed at Madison, Wisconsin, this 19th day of September, 1930.

EMIL TRUOG.